United States Patent Office 3,635,986
Patented Jan. 18, 1972

---

3,635,986
2-SUBSTITUTED AMINO-HEXAHYDROBENZO[a] QUINOLIZINES
John William Van Dyke, Jr., Elkhart, Ind., assignor to Miles Laboratories, Inc., Elkhart, Ind.
No Drawing. Continuation-in-part of application Ser. No. 650,579, July 3, 1967. This application Dec. 22, 1969, Ser. No. 887,342
Int. Cl. C07d 39/00
U.S. Cl. 260—287 R                    15 Claims

ABSTRACT OF THE DISCLOSURE 2-substitued amino-hexahydrobenzo[a]quinolizines and pharmacologically acceptable salts thereof that are useful as anti-hypertensive agents. Prepared by reacting 2-oxo-1,3,4,6,7,11b-hexahydro - 2H - benzo[a] quinolizine with an amine to form a Schiff base which is then reduced.

---

This application is a continuation-in-part of my copending patent application, Ser. No. 650,579, filed July 3, 1967, now abandoned.

This invention relates to new and useful compositions of matter and more particularly to 2-substituted amino-hexahydrobenzo[a]quinolizine and derivatives thereof and a novel process for the preparation of such compounds.

Compounds of the invention may be represented by the structural formula:

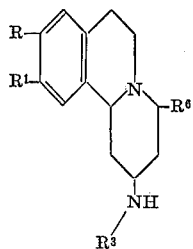

wherein R is a member selected from the group consisting of H, OH and O-(lower)alkyl, $R^1$ is a member selected from the group consisting of H, OH and O-(lower)alkyl, $R^3$ is a member selected from the group consisting of H, (lower)alkyl, cycloalkyl of between 3 and 7 carbon atoms, phenyl, substituted phenyl, diphenyl, phenyl(lower)alkyl and substituted phenyl(lower)alkyl in which the substituents are members selected from the group consisting of a halogen, (lower)alkyl, lower alkoxy, cyano, lower alkoxycarbonyl, and nitro, and $R^6$ is a member selected from the group consisting of H, (lower) alkyl and phenyl, and pharmacologically acceptable salts thereof. Preferably the (lower)alkyl groups of the compounds of this invention will have between 1 and 4 carbon atoms.

The compounds of this invention may be prepared according to the following reaction sequence.

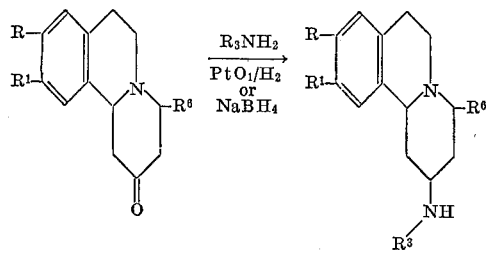

in which the values for R, $R^1$, $R^3$ and $R^6$ correspond respectively with their previous descriptions.

In the reaction sequence, 2-oxo-1,3,4,6,7,11b-hexahydro-2H-benzo[a]quinolizine is reacted with an amine in a suitable solvent to form a Schiff base having the primary structure of the new compounds of the invention. The solvent utilized is not critical and may be dry toluene, benzene, xylene, methanol, etc. The reaction mixture is advantageously maintained under reflux in the presence of a catalyst. The reaction time is not critical and advantageously is dependent upon the required amount of water being collected and may be between about one and twelve or more hours. The catalyst may be an acid catalyst and is preferably in organic acid catalyst such as p-toluenesulfonic acid.

The Schiff base that is formed is then reduced, forming an amine, Advantageously, this reduction is carried out in a suitable solvent such as methanol, ethanol, or 2-propanol. To form the transisomers, the reduction is beneficially carried out using $NaBH_4$. Preferably, for catalytic hydrogenation $PtO_2$ is used as a catalyst.

2-oxo-1,3,4,6,7,11b - hexahydro - 2H - benzo[a]quinolizine, the starting material in the above reaction sequence, may be prepared by the following reaction sequence:

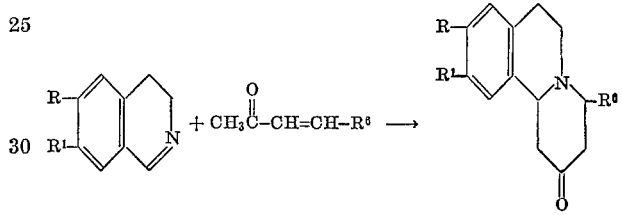

This synthesis is further described by Dénes Beke and Csba Szántay in Chem. Ber., 95, 2132–2136 (1962).

Compounds of the invention may be prepared and utilized in the form of the free base. Preferably, however, the compounds are used as pharmacologically acceptable non-toxic, water-soluble addition salts of inorganic or organic acids such as halogen acids, sulfuric acid, maleic acid and the like.

The novel compounds, either in the form of free bases or acceptable addition salts, are useful as antihypertensive agents.

Medications prepared with these compounds as active ingredients are readily formulated by mixing the compounds in dosage units with fillers, carriers, extenders and/or excipients generally used in preparing pharmaceutical formulations. When mixed in such a formulation, the compound may be in the form of a free base and is preferably in the form of a pharmacologically acceptable addition salt. The medication may be either in solid or liquid form and may be compounded as tablets, powders, capsules, suspensions and similar dosage forms according to accepted manufacturing methods. These medications may be administered, for example, orally or subcutaneously, in conformity with recognized pharmacological techniques.

The invention will be further understood by referring to the following examples which illustrate the preparation of a compound according to the invention. These examples will make clear to those skilled in the art how to facilely prepare other compounds within the scope of this invention as set forth in the appended claims.

EXAMPLE 1

N - [2 - (1,3,4,6,7,11b-hexahydro-2H-benzo[a]quinolizinyl)]aniline and trans isomers A mixture of 2-oxo-1,3,4,6,7,11b-hexahydro-2H-benzo [a]quinolizine (5.6 g., 0.027 mole), aniline (2.5 g., 0.027 mole) and 50 ml. of dry toluene was refluxed for 12 hours using a Dean-Stark trap with p-toluenesulfonic acid as a catalyst. The solvent was removed in vacuo and the residue extracted with n-hexane. The n-hexane solution was then concentrated in vacuo and the residue recrystallized from ether. A light tan product crystallized out (Schiff base). Yield, 2.14 g., M.P. 129°–131° C. A solution of the product 2 - phenylimino-1,3,4,6,7,11b-hexahydro-2H-benzo[a] quinolizine (2.14 g., 0.007 mole) in dry ethanol was hydrogenated using $PtO_2$ as a catalyst. After the reaction was complete, about one hour, the catalyst was removed by filtration and the filtrate concentrated in vacuo. Yield 2.2 g.

EXAMPLE 2

2 - anilino - 1,3,4,6,7,11b-hexahydro-2H-benzo[a]quinolizine (transisomer)

A Schiff base (73 g.; M.P. 129–131° C., prepared as in Example 1) was placed in a 3-necked flask, equipped with a reflux condenser and stirrer. 1500 ml. of methanol was added and stirred during the addition of $NaBH_4$ (19.7 g.). The solution was refluxed for 1 hour and cooled. Water (1500 ml.) was added to the solution and the methanol removed in vacuo. The aqueous solution was extracted with ether and dried over $MgSO_4$. The ether was removed in vacuo and the residue recrystallized from absolute ethanol. Yield, 40 g. A portion of this solid (5.5 g.) was dissolved in n-hexane, treated with charcoal, filtered and concentrated. On cooling, a white solid precipitated. The solid was dried over night in an abderhalden. Yield, 5.05, M.P. 104–105° C.

*Analysis.*—Calcd. for $C_{19}H_{22}N_2$ (percent): C, 81.96; H, 7.97; N, 10.06. Found (percent): C, 81.65; H, 8.11; N, 10.12.

EXAMPLE 3

1,3,4,6,7,11b - hexahydro - 2 - methylamino-2H-benzo[a] quinolizine dihydrochloride monohydrate A solution of 1,3,4,6,7,11b - hexahydro - 2H - benzo[a] quinolizine-2-one (40.2 g.; 0.2 M), a four fold excess of methyl amine (62.1 g. of 40% aqueous or 24.8 g.; 0.8 M), and a catalytic amount of p-toluenesulfonic acid in 500 ml. of MeOH was refluxed for 3½ hours, then cooled to room temperature. The solvent was removed in vacuo to yield a syrup. An I.R. spectrum of the syrup showed strong absorption at 1717 cm.$^{-1}$ and medium absorption at 1670 cm.$^{-1}$ indicating that only a minor amount of product had been formed. The syrup was dissolved in 300 ml. anhydrous EtOH and a catalytic amount of p-toluenesulfonic acid was added. The solution was placed in a Paar hydrogenation bottle and then cooled in an ice-bath. Gaseous anhydrous monomethylamine was bubbled through the solution until it was well saturated. The solution was then placed on the Paar Hydrogenation Apparatus and shaken at 65° C. and a pressure of 50 p.s.i. for 8 hours. The solution was then reduced to a syrup in vacuo. The I.R. spectrum of the syrup indicated that the desired product had been formed in major proportions. The syrup was dissolved in 300 ml. of MeOH and cooled in an ice-bath. $NaBH_4$ (16.0 g.) was added portionwise with stirring. After bubbling had ceased, the solution was refluxed for 1½ hours, then cooled. The solvent was removed in vacuo to yield a syrup. The syrup was then shaken with a 50:50 mixture of $H_2O$ and $Et_2O$ (400 ml.). The resulting two phases were separated and the aqueous phase was extracted with $Et_2O$. The combined ethereal extracts were dried over $MgSO_4$, then filtered. The filtrate was reduced in vacuo to a syrup. The I.R. spectrum did not reveal any imine or ketone absorption. A sample of the syrup was dissolved in anhydrous $Et_2O$ (1000 ml.) and gaseous HCl was bubbled through the stirred solution. A white precipitate formed which was removed by filtration and purified by successive recrystallization from anhydrous EtOH/EtOAc. Yield 6.0 g., M.P. 305–310° C. (varies with rate of heating).

*Analysis.*—Calcd. for $C_{14}H_{24}N_2Cl_2O$ (percent): N (Dumas) 9.12; C, 54.72; H, 7.87. Found (percent): N (Dumas) 8.99; C, 55.53; H, 8.12.

EXAMPLE 4

1,3,4,6,7,11b - hexahydro-2-cyclohexylamino-2H-benzo[a] quinolizine dihydrochloride A solution of 1,3,4,6,7,11b-hexahydro-2H-benzo[a]-quinolizine-2-one (20.1 g.; 0.1 m.), cyclohexylamine (9.9 g.; 0.1 m.), and a catalytic amount of p-toluenesulfonic acid in 200 ml. of benzene was refluxed for three hours using a Dean-Stark trap to remove the theoretical amount of $H_2O$. The solution was cooled and the solvent removed in vacuo to yield a dark orange oil. The I.R. spectrum of the oil showed strong imine absorption at 1660 cm.$^{-1}$. The oil was dissolved in 200 ml. of MeOH. To this stirred, ice-cold solution was added, portionwise, $NaBH_4$ (8.0 g.). After bubbling had ceased, the solution was refluxed for 1½ hours and cooled. The solvent was removed in vacuo and the residual oil shaken wtih a 50:50 mixture of $H_2O$ and $Et_2O$ (400 ml.). The resulting two phases were separated and the aqueous phase extracted with $Et_2O$. The combined ethereal extracts were dried over $MgSO_4$, then filtered. The filtrate was reduced in vacuo to an oil which crystallized upon cooling. An I.R. spectrum of the solid did not show any imine or ketone absorption. The oil was then distilled to give yellow oil. Nitrogen analysis of the oil confirmed the free base. Upon standing, the yellow oil solidified to a waxy solid which darkened in color upon standing. A sample of the yellow oil was dissolved in 500 ml. of anhydrous $Et_2O$ and a solution of HCl in 2-propanol (27.2 ml. of 2.06 N) was added. The white precipitate which formed was removed by filtration and recrystallized from 2-propanol/MeOH. Yield 6.0 g., M.P. 319–321° C. dec.

*Analysis.*—Calcd. for $C_{19}H_{30}N_2Cl_2$ (percent): N (Dumas) 7.84; C, 63.85; H, 8.46. Found (percent): N (Dumas) 7.65; C, 63.63; H, 8.76.

EXAMPLE 5

2-benzylamino-1,3,4,6,7,11b-hexahydro-2H-benzo[a] quinolizine dihydrochloride 1,3,4,6,7,11b - hexahydro-2H-benzo[a]quinolizine-2-one (40.2 g.; 0.2 m.) was dissolved in 450 ml. dry benzene. Benzylamine (21.43 g.; 0.2 m.) was added along with a catalytic amount of p-toluenesulfonic acid and the solution was refluxed for 3 hours using a Dean-Stark trap to remove 3.6 ml. $H_2O$. The solution was cooled and reduced in vacuo to a syrup. The I.R. spectrum showed the desired imine absorption at 1670 cm.$^{-1}$. The syrup was dissolved in 200 ml. of MeOH and cooled in an ice bath. Solid $NaBH_4$ (16 g.) was added in small portions, with stirring, to the cold MeOH solution. After bubbling had ceased, the resulting solution was refluxed for one hour, cooled and reduced in vacuo to a volume of 200 ml. Water (33 ml.) was slowly added followed by the addition of 300 ml. $Et_2O$. The resulting two phase system was transferred to a separatory funnel and the aqueous layer extracted with $Et_2O$. The combined $Et_2O$ extracts were dried over $MgSO_4$ and filtered. The filtrate was reduced in vacuo to a syrup. The I.R. spectrum did not show any imine or ketone absorption. A sample of the syrup was dissolved in 200 ml. of 2-propanol and a solution of HCl in 2-propanol was slowly added until the solution was strongly acidic. The solution was reduced to 200 ml. by boiling on a hot plate and EtOAc added until a white solid began to precipitate while the solution was hot. A white solid formed upon cooling which was removed by filtration and recrystallized from EtOH/EtOAc. Yield 6.5 g., M.P. 280–281° C. dec.

*Analysis.*—Calcd. for $C_{20}H_{26}N_2Cl_2$ (percent): N(Dumas) 7.67; C, 65.75; H, 7.17. Found (percent): N(Dumas) 7.54; C, 65.59; H, 7.47.

EXAMPLE 6

1,3,4,6,7,11b-hexahydro-2-phenethylamino-2H-benzo[a]quinolizine dihydrochloride 1,3,4,6,7,11b-hexahydro-2H-benzo[a]quinolizine-2-one (40.2 g.; 0.2 mole) was dissolved in 450 ml. dry benzene. β-phenethylamine (25.3 ml.; 24.24 g.; 0.2 mole) was added with a catalytic amount of p-toluenesulfonic acid and the solution refluxed for 1½ hours utilizing a Dean-Stark trap to remove 3.6 ml. $H_2O$. The solution was cooled and reduced to a syrup in vacuo. The I.R. spectrum of the syrup showed the desired imine absorption at 1670 cm.$^{-1}$. The syrup was then dissolved in 300 ml. of MeOH and cooled in an ice bath. A solution of $NaBH_4$ (16 g.) in 15 ml. of MeOH was then slowly added, with stirring, to the cooled solution of the syrup in MeOH. After bubbling had ceased, the solution was refluxed for 45 minutes, cooled and reduced in vacuo to a volume of 100 ml. Water (200 ml.) was slowly added followed by the addition of 200 ml. $Et_2O$. The two phase system was then transferred to a separatory funnel and the aqueous layer extracted with $Et_2O$. The combined $Et_2O$ extracts were dried over $MgSO_4$, then filtered. The filtrate was reduced in vacuo to a syrup. The I.R. spectrum of the syrup did not show any imine or ketone absorption. A portion of the syrup was dissolved in 150 ml. 2-propanol and the solution cooled in an ice bath. A solution of HCl in 2-propanol was added dropwise with stirring until the solution was strongly acidic. A white solid formed which was filtered and washed first with 2-propanol, then with $Et_2O$ to give 9.5 g. white solid which melted with decomposition at 300° C. The white solid was recrystallized from MeOH/EtOAc. Yield 7.5 g., M.P.326–329° C.

*Analysis.*—Calcd. for $C_{21}H_{28}N_2Cl_2$ (percent): N(Dumas) 7.39; C, 66,48; H, 7.44. Found (percent): N(Dumas) 7.44; C, 66.49; H, 7.74.

EXAMPLE 7

2-(3,4-dichloroanilino) - 1,3,4,6,7,11b - hexahydro - 2H- benzo[a]quinolizine dihydrochloride monomethanolate A solution of 1,3,4,6,7,11b-hexahydro - 2H - benzo[a] quinolizine-2-one (40.2 g.; 0.2 m.), 3,4-dichloroaniline (32.4 g.; 0.2 m.), and a catalytic amount of p-toluenesulfonic acid in 500 ml. of benzene was refluxed for 16 hours using a Dean-Stark trap to remove $H_2O$. The solution was cooled and the solvent removed in vacuo to yield a dark-orange solid. The I.R. spectrum showed strong imine absorption. The solid was added to 300 ml. of MeOH and the resulting mixture was then stirred and cooled in an ice-bath. Solid $NaBH_4$ (20 g.) was added portionwise to the above stirred mixture. After bubbling had ceased, the mixture was refluxed for 16 hours and cooled. The filtrate was reduced in vacuo to a syrup which was shaken with a mixture of $H_2O/Et_2O$ (50:50; 1000 ml.). The resulting two phases were separated and the aqueous phase was extracted with $Et_2O$. The combined $Et_2O$ extracts were dried over $MgSO_4$, then filtered. The filtrate was reduced in vacuo to a dark orange syrup. The I.R. spectrum indicated the presence of $H_2O$. The syrup was divided into two equal portions and one portion was dissolved in 300 ml. of benzene and dried over $MgSO_4$. The $MgSO_4$ was removed by filtration and 300 ml. of anhydrous $Et_2O$ (300 ml.) added to the benzene solution. The resulting solution was cooled in an ice-bath and gaseous HCl bubbled through with stirring. The white precipitate which formed was removed by filtration, washed with anhydrous $Et_2O$ and recrystallized from MeOH. Yield 12.7 g., M.P. 209–212° C.

*Analysis.*—Calcd. for $C_{20}H_{26}N_2OCl_4$ (percent): N(Dumas) 6.19; C, 53.11; H, 5.80. Found (percent): N(Dumas) 6.26; C, 53.64; H, 5.80.

EXAMPLE 8

2-(m-methylanilino)-1,3,4,6,7,11b-hexahydro-2H-benzo-[a]quinolizine dihydrochloride A solution of 1,3,4,6,7,11b-hexahydro - 2H - benzo[a] quinolizine-2-one (20.1 g.; 0.1 m.), m-toluidine (10.7 g.; 0.1 m.), and a catalytic amount of p-toluenesulfonic acid in 300 ml. of benzene was refluxed under a nitrogen atmosphere for 17 hours. A Dean-Stark trap was utilized to remove 1.8 ml. of $H_2O$. The solvent was removed from the reaction solution in vacuo to yield a dark orange oil. The I.R. spectrum exhibited strong imine absorption. The oil was dissolved in 250 ml. of MeOH and cooled in an ice-bath. Solid $NaBH_4$ (8 g.) was added portionwise, with stirring, to the cold MeOH solution. After bubbling ceased, the solution was refluxed for 3 hours and cooled. The solvent was removed in vacuo and the resulting semi-solid residue was extracted with $CHCl_3$ vs. $H_2O$. The $CHCl_3$ extracts were dried over $MgSO_4$ and filtered. The filtrate was reduced in vacuo to an oil. The I.R. spectrum did not exhibit any imine or ketone absorptions.. The oil was dissolved in hot aqueous EtOH and upon cooling a white crystalline product formed. The solid was removed by filtration, washed with cold aqueous EtOH, and dried overnight in vacuo at 78° C. The solid was dissolved in anhydrous $Et_2O$ (400 ml.) and 34 ml. of a 2.06 N solution of HCl in 2-propanol was added with stirring to the cold $Et_2O$ solution. A white solid precipitated which was removed by filtration and purified by recrystallizing twice from 2-propanol. The recrystallized product was triturated with anhydrous $Et_2O$ and recrystallized from anhydrous EtOH. Yield 5.7 g., softened above 230° C. and M.P. 256–266° C.

*Analysis.*—Calcd. for $C_{20}H_{26}Cl_2N_2$ (percent): N(Dumas) 7.66; C, 65.74; H, 7.17. Found (percent): N(Dumas) 7.49; C, 65.53; H, 7.47.

EXAMPLE 9

1,3,4,6,7,11b-hexahydro-2-(4-methylanilino) - 2H - benzo [a]quinolizine monohydrochloride monohydrate A solution of 1,3,4,6,7,11b-hexahydro-2H-benzo[a] quinolizine-2-one (20.1 g.; 0.1 m.), p-toluidine (10.7 g.; 0.1 m.), and a catalytic amount of p-toluenesulfonic acid in 500 ml. of benzene was refluxed under a nitrogen atmosphere for 7 hours utilizing a Dean-Stark trap to remove 1.8 ml. of $H_2O$. The solvent was removed in vacuo and the I.R. spectrum of the solid residue exhibited strong imine absorption at 1660 cm.$^{-1}$ and *weak* ketone at 1717 cm.$^{-1}$.

Solid $NaBH_4$ (10 g.) was added portionwise with stirring to a cold suspension of the residual solid in 500 ml. of MeOH. When bubbling had ceased, the resulting solution was refluxed for two hours, cooled and the solvent removed in vacuo. The resulting solid was extracted with $H_2O$ vs. $CHCl_3$. The $CHCL_3$ extracts were dried over $MgSO_4$ and filtered. The filtrate was reduced in vacuo and the I.R. spectrum of the resulting oil was devoid of imine or ketone absorptions. Attempts to obtain a crystalline product from the oil were unsuccessful. Attempts to resolve the mixture utilizing column chromatography were unsuccessful and some of the oil was recovered. The oil was dissolved in hot benzene and clarified with charcoal. Removal of the solvent in vacuo yielded a light yellow oil. The oil was dissolved in 2-propanol and 30 ml. of 2.7 N HCl in 2-propanol added. Cooling of the resulting solution did not yield a crystalline product and anhydrous $Et_2O$ was added until no further precipitate was formed. The precipitate was removed by filtration and dissolved in hot $H_2O$. Cooling resulted in a pink solid. Yield 6.0 g., M.P. 150–200° C. dec.

The pink solid was dissolved in hot $H_2O$ and clarified with charcoal. Cooling of the aqueous solution yielded 2 g. of a white solid, M.P. (not sharp) 170–235° C. dec.

Recrystallization of the white solid yielded 1.9 g. of a white solid which slowly melted with decomposition above 273° C.

*Analysis.*—Calcd. for $C_{20}H_{27}N_2OCl$ (percent): N, 8.07; C, 69.25; H, 7.84; HCl, 10.51. Found (percent): N, 8.14; C, 71.35; H, 7.90; HCl, 10.61.

EXAMPLE 10

2-(2,4-dimethoxyanilino)-1,3,4,6,7,11b-hexahydro-2H-benzo[a]quinolizine

A solution of 1,3,4,6,7,11b-hexahydro-2H-benzo[a]-quinolizine-2-one (40.2 g.; 0.2 m.), 2,4-dimethoxyaniline (33.7 g.; 0.22 m.), and a catalytic amount of p-toluenesulfonic acid in 500 ml. of benzene was refluxed for 20 hours in an atmosphere of nitrogen using a Dean-Stark trap to remove $H_2O$. The reaction solution was cooled and the solvent removed in vacuo to yield a dark syrup. The I.R. spectrum showed imine absorption at 1660 cm.$^{-1}$. The syrup was dissolved in 500 ml. of MeOH and cooled in an ice-bath. Solid $NaBH_4$ (16.0 g.) was added portionwise with stirring to the above cold solution. After bubbling had ceased, the mixture was refluxed for one hour and cooled. The solid which formed was removed by filtration, washed with cold MeOH, and air dried at room temperature. Yield 36.8 g., M.P. 116–118° C.

*Analysis.*—Calcd. for $C_{21}H_{26}N_2O_2$ (percent): N-(Dumas) 8.28; C, 74.53; H, 7.74. Found (percent): N-(Dumas) 8.11; C, 74.21; H, 7.88.

The HCl salt was prepared utilizing conventional procedures.

*Analysis.*—Calcd. for $C_{21}H_{28}N_2O_2Cl_2$ (percent): N, 6.81; C, 61.31; H, 6.86. Found (percent): N, 6.61; C, 60.81; H, 7.06.

EXAMPLE 11

1,3,4,6,7,11b - hexahydro-2-(3,4,5-trimethoxyanilino)-2H-benzo[a]quinolizine dihydrochloride monomethanolate A solution of 1,3,4,6,7,11b-hexyhydro-2H-benzo[a]quinolizine-2-one (30.2 g.; 0.15 m.), 3,4,5-trimethoxyaniline (27.5 g.; 0.15 m.), and a catalytic amount of p-toluenesulfonic acid in 500 ml. of benzene was refluxed for 16 hours in an atmosphere of nitrogen using a Dean-Stark trap to remove $H_2O$. The solution was cooled and the solvent removed in vacuo to yield a dark reddish-orange syrup. The I.R. spectrum showed strong imine absorption at 1660 cm.$^{-1}$. The syrup was dissolved in 400 ml. of MeOH and the resulting solution cooled in an ice-bath. Solid $NaBH_4$ (12 g.) was added portionwise, with stirring, to the above cold solution. When bubbling had ceased the solution was refluxed for 4 hours and cooled to room temperature. The solvent was removed in vacuo and the residue was shaken with 600 ml. of a mixture of $H_2O$ and $Et_2O$ (50:50). The resulting two phases were separated and the aqueous phase extracted with $Et_2O$. The extracts were dried over $MgSO_4$ and filtered. The filtrate was reduced in vacuo to a dark syrup. The dark syrup was dissolved in 600 ml. of benzene and divided into two equal 300 ml. aliquots. One 300 ml. portion of the benzene solution was added to 300 ml. of anhydrous $Et_2O$ and the resulting solution was cooled in an ice-bath. Gaseous HCl was bubbled through the solution with stirring until no further precipitate formed. The light-tan solid which formed was removed by filtration and washed with anhydrous $Et_2O$. The product was recrystallized from MeOH. Yield 6.2 g., M.P. 225–228° C. dec.

*Analysis.*—Calcd. for $C_{23}H_{34}N_2O_4Cl_2$ (percent): N-(Dumas) 5.92; C, 58.34; H, 7.24. Found (percent): N-(Dumas) 6.03; C, 58.90; H, 7.13.

EXAMPLE 12

2-(p-cyanoanilino)-1,3,4,6,7,11b-hexahydro-2H-benzo[a]quinolizine hydrochloride

A solution of 1,3,4,6,7,11b - hexahydro - 2H - benzo[a]quinolizine-2-one (20.1 g.; 0.1 m.), p-aminobenzonitrile (11.8 g.; 0.1 m.), and a catalytic amount of p-toluenesulfonic acid in 250 ml. of benzene was refluxed under a nitrogen atmosphere for 96 hours. A Dean-Stark trap was utilized to remove 1,2 ml. of $H_2O$ (theory=1.8 ml. $H_2O$). The volume was reduced to 75 ml. by distillation. The orange solid formed upon cooling was removed by filtration. The I.R. spectrum exhibited strong nitrile absorption at 2225 cm.$^{-1}$ and strong imine absorption at 1670 cm.$^{-1}$. There was *no* ketone absorption. The orange solid was suspended in 300 ml. of MeOH and cooled in an ice-bath. Solid $NaBH_4$ (20 g.) was added portion-wise with stirring. When bubbling had ceased, the resulting solution was refluxed for 2 hours, cooled and the solvent removed in vacuo. The resulting semi-solid residue was extracted with $CHCl_3$ vs. $H_2O$. The $CHCl_3$ extracts were dried over $MgSO_4$ and filtered. The filtrate was reduced in vacuo and the I.R. spectrum of the resulting yellow oil did not exhibit any imine absorption but retained the desired nitrile absorption. A light yellow solid was obtained from the yellow oil by dissolution of the oil in hot aqueous EtOH and allowing the resulting solution to cool. The yellow solid was dissolved in $CHCl_3$ and cooled in an ice-bath. A solution of HCl in 2-propanol was added with stirring. Anhydrous $Et_2O$ was added andd the resulting yellow precipitate removed by filtration and recrystallized from 2-propanol to yield a yellow solid. The yellow solid was stirred in 400 ml. of boiling $CHCl_3$, the mixture cooled and filtered to yield a white solid. The white solid was recrystallized from anhydrous EtOH. Yield 6.7 g.; softened and slowly melted with decomposition above 208° C.

*Analysis.*—Calcd. for $C_{20}H_{22}N_3Cl$ (percent): N-(Dumas) 12.36; C, 70.67; H, 6.52; HCl, 10.73. Found (percent): N(Dumas) 12.31; C, 71.14; H, 6.88; HCl, 10.72.

EXAMPLE 13

2-(4-ethoxycarbonyl)anilino-1,3,4,6,7,11b-hexahydro-2H-benzo[a]quinolizine hydrochloride A solution of 1,3,4,6,7,11b - hexahydro - 2H - benzo[a]quinolizine-2-one (20.1 g.; 0.1 m.), ethyl - p - aminobenzoate (16.6 g.; 0.1 m.), and a catalytic amount of p-toluenesulfonic acid in 500 ml. of benzene was refluxed overnight using a Dean-Stark trap to remove $H_2O$. The solvent was removed in vacuo and the I.R. spectrum of the resulting dark syrup exhibited both strong ester and imine absorptions. The syrup was dissolved in anhydrous EtOH. The resulting solution was chilled in an ice-bath and solid $NaBH_4$ (10 g.) was added portionwise with stirring. When bubbling had ceased, the solution was refluxed for one hour whereupon the solution solidified. The excess solvent was removed in vacuo and the residue shaken with a 1:1 mixture of $Et_2O/H_2O$. The resulting two phases were separated. The aqueous phase was further extracted with $Et_2O$ and the combined $Et_2O$ extracts were dried over $MgSO_4$ and filtered. The filtrate was reduced in vacuo to a yellow oil. The oil was dissolved in $CHCl_3$ and 73.5 ml. of 2.7 N HCl in 2-propanol was added with stirring. The resulting solution was cooled in an ice-bath and anhydrous $Et_2O$ added until no further precipitate was formed. A brown precipitate formed which was removed by filtration and dissolved in hot MeOH. Water was added to the boiling MeOH solution and a solid began to form as the MeOH boiled off. Concentrated HCl (25 ml.) was added and the mixture boiled to remove the MeOH leaving an aqueous mixture. The mixture was cooled in an ice-bath and the solid removed by filtration. The solid was recrystallized from MeOH. Yield 2.5 g., M.P. 271–275° C. dec.

*Analysis.*—Calcd. for C$_{22}$H$_{27}$N$_2$O$_2$Cl (percent): N, 7.24; C, 68.30; H, 7.03. Found (percent): N, 7.18; C, 67.87; H, 7.01.

EXAMPLE 14

2-(4-biphenylamino)-1,3,4,6,7,11b-hexahydro-2H-benzo[a]quinolizine dihydrochloride A solution of 1,3,4,6,7,11b - hexahydro - 2H - benzo[a]quinolizine - 2-one (20.1 g.; 0.1 m.), 4-aminobiphenyl (16.9 g.; 0.1 m.), and a catalytic amount of p-toluenesulfonic acid in 250 ml. of benzene was refluxed under a nitrogen atmosphere for 18 hours. A Dean-Stark trap was utilized to remove 1.8 ml. of H$_2$O. The solvent was removed in vacuo and the I.R. spectrum of the resulting reddish-orange oil exhibited strong absorption for imine at 1670 cm.$^{-1}$. The oil was dissolved in 500 ml. of MeOH and the resulting solution cooled in an ice-bath. Solid NaBH$_4$ (8 g.) was added portionwise with stirring. When bubbling ceased, the solution was refluxed for 2 hours. A solid began to precipitate from the solution and approximately 350 ml. of solvent was removed by distillation. After cooling, the mixture was filtered to yield a light colored solid. The solid was recrystallized from 95% EtOH. The solid was dissolved in CHCl$_3$ aand cooled in an ice-bath. A solution of HCl in 2-propanol (40 ml. of 2.06 N) was added with stirring. Anhydrous Et$_2$O was added, the resulting precipitate removed by filtration and recrystallized from MeOH. Yield 10.2 g., softening at 250° C. M.P. 258–268° C.

*Analysis.*—Calcd. for C$_{25}$H$_{28}$Cl$_2$N$_2$ (percent): N-(Dumas) 6.56; C, 70.26; H, 6.60. Found (percent): N(Dumas) 6.58; C, 70.81; H, 6.91.

EXAMPLE 15

2-(m-nitroanilino)-1,3,4,6,7,11b-hexahydro-2H-benzo[a]quinolizine dihydrochloride A solution of 1,3,4,6,7,11b - hexahydro - 2H - benzo[a]quinolizine-2-one (20.1 g.; 0.1 m.), m-nitroaniline (13.8 g.; 0.1 m.), and a catalytic amount of p-toluenesulfonic acid in 500 ml. of benzene was refluxed under a nitrogen atmosphere for 20 hours utilizing a Dean-Stark trap to remove 1.6 ml. of H$_2$O. The solvent was removed in vacuo and the I.R. spectrum of the resulting oil exhibited both imine and ketone absorptions. The oil was dissolved in 500 ml. of MeOH and a precipitate formed. The mixture was cooled and the solid removed by filtration to yield a yellow solid. This compound was the pure imine product as shown by I.R. data. The solid was suspended in 250 ml. of MeOH and cooled in an ice-bath. Solid NaBH$_4$ (10 g.) was added portionwise, with stirring, to the cold suspension. The cold suspension was stirred for 3 hours and the ice-bath was removed. The temperature rose to 45° C. before cooling to room temperature. The suspension was cooled in an ice-bath and a solid was then removed by filtration to yield a bright yellow solid. The solid was dissolved in an Et$_2$O/CHCl$_3$ mixture and the resulting solution was cooled in an ice-bath as gaseous HCl was bubbled through. The resulting precipitate was removed by filtration and recrystallized from 2-propanol to yield a light yellow solid. Yield 6.4 g., M.P. 211–216° C. dec.

*Analysis.*—Calcd. for C$_{19}$H$_{23}$N$_3$O$_2$Cl$_2$ (percent): N, 10.60; C, 57.58; H, 5.85; HCl, 18.40. Found (percent): N, 10.63; C, 58.12; H, 6.00; HCl, 17.93.

What is claimed is:
1. A compound selected from the group consisting of compounds of the formula

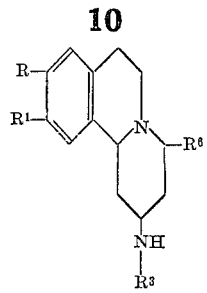

in which R is a member selected from the group consisting of H, OH and O-(lower)alkyl, R$^1$ is a member selected from the group consisting of H, OH and O-(lower)alkyl, R$^3$ is a member selected from the group consisting of H, lower alkyl, cycloalkyl of between 3 and 7 carbon atoms, phenyl, substituted phenyl, diphenyl, phenyl (lower)alkyl and substituted phenyl (loweralkyl in which the substituent is homogeneous member selected from the group consisting of a halogen, methyl, ethyl, methoxy, ethoxy, mono cyano, methoxy or ethoxy carbonyl, and *m* or *p* nitro, and R$^6$ is a member selected from the group consisting of H, (lower)alkyl and phenyl, and pharmacologically acceptable mono, poly or mixed salts of said compounds.

2. The compound of claim 1 which is 2-anilino-1,3,4,6,7,11b-hexahydro-2H-benzo[a]quinolizine.

3. The compound of claim 1 which is 1,3,4,6,7,11b-hexahydro-2-methylamino-2H-benzo[a]quinolizine.

4. The compound of claim 1 which is 1,3,4,6,7,11b-hexahydro-2-cyclohexylamino-2H-benzo[a]quinolizine.

5. The compound of claim 1 in which is 2-benzylamino-1,3,4,6,7,11b-hexahydro-2H-benzo[a]quinolizine.

6. The compound of claim 1 which is 1,3,4,6,7,11b-hexahydro-2-phenethylamino-2H-benzo[a]quinolizine.

7. The compound of claim 1 which is 2-(3,4-dichloroanilino)-1,3,4,6,7,11b - hexahydro - 2H - benzo[a]quinolizine.

8. The compound of claim 1 which is 2-(m-methylanilino) - 1,3,4,6,7,11b-hexahydro-2H-benzo[a]quinolizine.

9. The compound of claim 1 which is 1,3,4,6,7,11b-hexahydro-2-(4-methylanilino)-2H-benzo[a]quinolizine.

10. The compound of claim 1 which is 2-(2,4-dimethoxyanilino) - 1,3,4,6,7,11b - hexahydro - 2H - benzo[a]quinolizine.

11. The compound of claim 1 which is 1,3,4,6,7,11b-hexahydro - 2 - (3,4,5 - trimethoxyanilino) - 2H - benzo[a]quinolizine.

12. The compound of claim 1 which is 2-(p-cyanoanilino) - 1,3,4,6,7,11b - hexahydro - 2H-benzo[a]quinolizine.

13. The compound of claim 1 which is 2-(4-ethoxycarbonyl) - anilino - 1,3,4,6,7,11b - hexahydro - 2H-benzo[a]quinolizine.

14. The compound of claim 1 which is 2-(4-biphenylamino) - 1,3,4,6,7,11b - hexahydro - 2H-benzo[a]quinolizine.

15. The compound of claim 1 which is 2-(m-nitroanilino - 1,3,4,6,7,11b - hexahydro - 2H - benzo[a]quinolizine.

References Cited

UNITED STATES PATENTS 3,533,218 1/1971 Unger _____ 260—286
3,557,120 1/1970 Archer _____ 260—288

OTHER REFERENCES

Batersby et al.: Chem. Abstracts, vol. 54, col. 13128 (1960).

DONALD G. DAUS, Primary Examiner

U.S. Cl. X.R.

260—283 R, 286 R, 288 R, 999

PO-1050
(5/69)

UNITED STATES PATENT OFFICE
CERTIFICATE OF CORRECTION

Patent No. 3,635,986      Dated January 18, 1972

Inventor(s) John W. VanDyke, Jr.

It is certified that error appears in the above-identified patent and that said Letters Patent are hereby corrected as shown below:

| | | |
|---|---|---|
| Column 1, | Line 14, | In the chemical name "substitued" should read --"Substituted". |
| | Lines 60-70 | In the reaction sequence, "$PtO_1$" should read --$PtO_2$--. |
| Column 2, | Line 17, | "transisomers" should read --trans isomers--. |
| | Line 67, | Immediately following "aniline" insert --cis--. |
| Column 8, | Line 10, | "1,2" should read --1.2--. |
| Column 9, | Line 26, | "aand" should read --and--. |
| Column 10 | Line 18, | "(loweralkyl" should read --(lower)alkyl--. |
| | Line 19, | Immediately following "is" insert --a--. |

Signed and sealed this 19th day of September 1972.

(SEAL)
Attest:

EDWARD M. FLETCHER, JR.　　　　　　　ROBERT GOTTSCHALK
Attesting Officer　　　　　　　　　　Commissioner of Patents /dp